United States Patent
Specht et al.

(10) Patent No.: US 9,650,015 B2
(45) Date of Patent: May 16, 2017

(54) BELT RETRACTOR FOR A VEHICLE SAFETY BELT

(71) Applicant: Key Safety Systems Inc., Sterling Heights, MI (US)

(72) Inventors: Martin Specht, Feldafing (DE); Guillem Aranda, Munich (DE); Antonio Ferrao, Alling (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 14 days.

(21) Appl. No.: 14/477,452

(22) Filed: Sep. 4, 2014

(65) Prior Publication Data

US 2015/0122931 A1    May 7, 2015

Related U.S. Application Data (63) Continuation of application No. PCT/IB2013/000334, filed on Mar. 7, 2013.

(51) Int. Cl.
*B60R 22/34*    (2006.01)
*B60R 22/28*    (2006.01)

(52) U.S. Cl.
CPC .... *B60R 22/3413* (2013.01); *B60R 2022/285* (2013.01); *B60R 2022/288* (2013.01)

(58) Field of Classification Search
CPC .......... B60R 22/3413; B60R 2022/285; B60R 2022/288
See application file for complete search history.

(56) References Cited

U.S. PATENT DOCUMENTS

| | | | | |
|---|---|---|---|---|
| 3,881,667 A | * | 5/1975 | Tandetzke | B60R 22/3413 242/379.1 |
| 5,350,793 A | * | 9/1994 | Kishimoto | C08K 3/0033 524/425 |
| 6,241,172 B1 | * | 6/2001 | Fugel | B60R 22/3413 242/379.1 |
| 6,659,505 B1 | * | 12/2003 | Knox | B60R 22/3413 242/379.1 |
| 6,789,761 B2 | * | 9/2004 | Glinka | B60R 22/3413 242/379.1 |
| 7,478,836 B2 | * | 1/2009 | Lenning | B60R 22/28 242/381 |
| 7,694,908 B2 | * | 4/2010 | Lucht | B60R 22/4676 242/374 |
| 7,828,331 B2 | * | 11/2010 | Jessup | B60R 22/3413 242/379.1 |
| 2003/0201357 A1 | * | 10/2003 | Koning | B60R 22/3413 242/379.1 |

(Continued)

FOREIGN PATENT DOCUMENTS

DE      4108252 A1 * 9/1992

*Primary Examiner* — Emmanuel M Marcelo
*Assistant Examiner* — Justin Stefanon
(74) *Attorney, Agent, or Firm* — Markell Seitzman (57) ABSTRACT

A belt retractor comprising a safety belt reel (1) rotatably mounted on a frame (7) and a load limiter (2) which acts on a rotational movement of the belt reel (1) and has a switchable energy consumption, said load limiter having a granulate (3), which is enclosed in a closed load limiter chamber (8) and consists of dry, granular solid, and at least one rotating member (4) which can be rotated relative to the granulate (3), the energy consumption resulting from shear forces acts between the grains of granulate.

30 Claims, 9 Drawing Sheets

(56) References Cited

U.S. PATENT DOCUMENTS

| | | | |
|---|---|---|---|
| 2004/0244207 A1* | 12/2004 | Menzel | B25F 5/006 30/381 |
| 2007/0135982 A1* | 6/2007 | Breed | B60J 10/00 701/36 |
| 2009/0005935 A1* | 1/2009 | Lenning | B60R 22/28 701/45 |

* cited by examiner

BELT RETRACTOR FOR A VEHICLE SAFETY BELT

RELATED APPLICATIONS

This application is a continuation of International Application No. PCT/IB2013/000334 filed Mar. 7, 2013 which claims the benefit of German Application No. DE 102012004603 filed Mar. 7, 2012.

TECHNICAL FIELD

The invention relates to a belt retractor for a vehicle safety belt, in which a safety belt reel is rotatably mounted on a frame and which includes a load limiter which acts on a rotational movement of the belt reel and has a switchable energy consumption.

BACKGROUND OF THE INVENTION

In such a prior art safety belt retractor known from DE 10 2009 014 999 A1, the load limiter contains a brake with which relative rotation between the element to be braked and a support element produces a rise in pressure inside a pressure chamber, which is then converted into an brake actuating force. A medium which is filled into the pressure chamber may be silicone, or more specifically a silicone granulate, the particle diameter of which is approximately 0.2 to 0.3 mm and by means of which an axially mobile displacement element can be partly sheared. The displacement element displaces the medium provided in the pressure chamber, thus cause the rise in pressure in the pressure chamber, which is then converted into the brake actuation force. In this prior art load limiter, load limitation is performed by the brake only, and not by the medium.

The purpose of the load limiter is to limit the forces acting during an accident between the safety belt and the vehicle passenger wearing the safety belt and who is moved further forwards in the motor vehicle seat.

The object of the invention is to provide a belt retractor in which the load limiting effect is automatically adjusted, depending on the vehicle passenger data and the severity of the respective accident.

This object is achieved, according to the invention, by the features of claim 1.

The dependent claims contain advantageous developments of the invention.

SUMMARY OF THE INVENTION

The invention provides a belt retractor, the safety belt reel of which is rotatably mounted on a frame of the belt retractor and the rotational movement of which is influenced in the case of an accident by a load limiter in an energy-consuming or energy-absorbing manner. The energy consumption of the load limiter is activated only when an accident is occurring and the forces acting between the safety belt and the vehicle passenger wearing the seat belt must be limited when the vehicle passenger moves forwards.

To that end, the belt reel may be designed in two parts, the one belt reel part being prevented in a known manner with the aid of a blocking mechanism from rotating in relation to the frame, the other belt reel part being rotated if the safety belt is being unwound by the vehicle passenger who has moved forwards. The rotational movement of the belt reel is affected by the load limiter consuming or absorbing energy.

The load limiter according to the invention contains a closed space (load limiter chamber), in which a granulate consisting of dry, granular solid is enclosed. In the closed space, at least one body which is moveable relative to the granular granulate is provided, which can be embodied as a linearly moveable displacer body or piston, or as a rotatable rotating member. In the event of an accident, the body is moved relative to the granulate, wherein the energy consumption results from shear forces acting between the granules of granulate. This limits the forces acting between the safety belt and the vehicle passenger. The granulate may be such that it expands as a result of the forces acting on the granules. The granulate may also be miscible with at least one propellant which can be introduced into the load limiter chamber or provided in the load limiter chamber.

It is possible in this way for a substantially uniform forward displacement, in particular a substantially uniform forward displacement speed of the vehicle passenger, to be achieved by the energy absorbing load limiter, in accidents of different severities, that is to say with different accelerative and braking forces acting on the body of the vehicle passenger, and for different body data, in particular body weight and size of the vehicle passenger. This is essentially based on the fact that, with changing rotational speed, there is also a change in the resistance acting in the granulate medium against movement of the rotating member in relation to the granulate. In an accident, a 95th percentile man will unwind the safety belt from the belt reel at a higher rotational speed, and as a result will cause a higher rotational speed of the rotating member which is rotatable in the granulate, than a 5th percentile woman. The granulate will thus resist the linear movement of the displacer body or the rotational movement of the rotating member in the granulate with a stronger resistance in the case of a 95th percentile man than in the case of a 5th percentile woman. It is possible in this way to achieve substantially the same kinematic curves for the load limiter for different vehicle passengers. The resistance in the granulate against body movement is generated by the shear forces acting between the granules in the granulate, in which forces are exerted between adjacent granules of granulate. This play of forces can produce dynamic force chains within the granulate, said force chains ensuing during the linear movement of the displacer body or the rotation of the rotating member in the granulate, and receding again to produce new force chains. Breakage and destruction of the granules in the granulate can also occur in the process. Heat may also be generated as a result of this energy consumption.

The at least one rotating member is preferably arranged fixedly in the direction of its rotational axis inside the closed load limiter chamber in which the granulate is enclosed. This means that the rotating member applies only a rotating movement on the granulate. It is preferred that the rotating member can be deformed in the radial direction when consuming energy. Stronger shear forces are thus exerted on granules of granulate that are disposed between the outer circumference of the rotating member and the inner wall of the closed load limiter chamber. The at least one rotating member may be dipped wholly or partially into the granulate.

The at least one rotating member is preferably embodied as an impeller, the vanes of which are dipped into or submerged in the granulate. The rotating member may be rigidly connected to the belt reel, however it is also possible to provide a coupling and/or a transmission gear between the belt reel and the at least one rotating member. The vanes of the impeller may be curved and/or may have a twist. The rotating member and in particular the impeller may be embodied in such a way that the granules of granulate are radially displaced during rotation.

A transmission gear may be provided between the load limiter and the belt reel, which transmits the torque emanating from the belt reel to the load limiter with varying ratios, in particular to the displacer body which is linearly moveable in the granulate or to the rotating member. The varying transmission ratio of the transmission gear is preferably a progressive transmission ratio. To that end, the transmission gear may have a load transmission point at which the torque of the belt reel is transmitted to the load limiter. In order to achieve the varying transmission ratio, in particular the progressive transmission ratio, the distance between the load transmission point and a rotational axis about which the load transmission point is rotated during load-limited rotation of the belt reel may vary. This variation is performed along a spiral, wherein the distance between the load transmission point and the rotational axis decreases during load-limited rotation of the belt reel. It is preferable that the torque of the belt reel can be transmitted via a load cable from the load transmission point to the load limiter, in particular to the linearly moveable displacer body or the rotating member.

When a transmission gear with a varying transmission ratio is used, in particular when a transmission gear with a progressively varying transmission ratio between the belt reel and the load limiter is used, the load limiter may also have be embodied differently. For example, the load limiter may be conventionally designed as a torsion bar or may have a deformation body, with which the movement or deformation work produced by the belt reel is performed to achieve the limitation of load.

The granulate is preferably made of hard granules having a Mohs hardness of at least 4 (absolute abrasive hardness: 5). The granulate may include granules of different material and/or of different hardnesses, i.e. different degrees of hardness. The granulate may preferably consist of quartz ($SiO_2$) sand. The granules may also consist of some other material, for example of plastic, mineral grains, glass, metals and the like.

The granulate in the closed load limiter chamber preferably has a bulk density (mass/volume) in a range between 1 $g/cm^3$ and 4.5 $g/cm^3$, the bulk density varying within said range according to the specific weight of the granule material.

The load limiter may additionally have a torsion bar which may be arranged parallel to, or in series with the load limiter part made of the dilatant granulate and the at least one rotatable rotating member.

The bulk density of the granulate in the load limiter chamber can preferably be adjusted according to the severity of the accident and/or the body data of the vehicle passenger wearing the seat belt. The body data of the vehicle passenger wearing the seat belt can be determined by detecting the length of belt strap extension which is pulled out from the parked position of the belt reel when the safety belt is put on. The seated position of the motor vehicle seat in the direction of the vehicle length can be taken into account thereby. It is also possible to detect the weight of the vehicle passenger on the motor vehicle seat and, if necessary, to visually detect his or her body size. Depending on these data, the bulk density of the granulate in the load limiter chamber can preferably be adjusted by altering the volume of the load limiter chamber accordingly.

The bulk density of the granulate in the load limiter chamber can also be adjusted according to the acceleration or the speed with which the belt is unreeled during the load-limited forward movement of the vehicle passenger. This can be done, for example, with the aid of a rotational speed sensor which detects the rotational movement of the belt reel or the rotational movement of the rotatable belt reel part during forward movement of the vehicle passenger wearing the seat belt. With the aid of a controller which is connected to the rotational speed sensor and which is separately provided, or integrated in the on-board computer of the vehicle, the speed or the acceleration of the belt strap is determined and a corresponding adjusting movement is generated for changing the volume of the load limiter chamber. Due to the change in volume, the bulk density of the granulate in the load limiter chamber is changed accordingly.

Advantageously, the desired load limitation is achieved with the invention after relatively short extension of the belt strap, even in the case of a 95th percentile man.

BRIEF DESCRIPTION OF THE DRAWINGS

Embodiments of the invention shall now be described in detail with reference to the Figures, in which.

DETAILED DESCRIPTION OF THE INVENTION

In the embodiments shown, the belt retractor in each case has a frame 7, on which safety belt reel 1 for a motor vehicle is rotatably mounted. The belt retractor also contains a load limiter 2, which acts on a rotational movement of belt reel 1 in an accident and consumes energy thereby.

Load limiter 2 has a closed load limiter chamber 8, in which a granulate 3 is enclosed. Granulate 3 consists of a dry, granular solid. The granules of granulate may have a specific hardness equivalent to a Mohs hardness of at least 4 (absolute abrasive hardness: 5). For example, the granules of granulate consist of mineral granules, such as quartz ($SiO_2$) sand. However, the granules of granulate may also consist of plastic, glass or metallic material. The diameter of the substantially rounded granules of granulate ranges between 0.1 and 0.4 mm. The granules of granulate may also consist of different materials and/or have different hardnesses.

Load limiter 2 also has a rotating member 4, which is disposed in load limiter chamber 8 and is rotatable relative to granulate 3. Rotating member 4 is in rotary drive communication with belt reel 1. To that end, rotating member 4 is connected non-rotatingly to belt reel 1, as shown in the embodiment in FIGS. 4-7, or is in drive communication with belt reel 1 via a transmission gear and/or a switchable coupling. This may be the case in the embodiments shown in FIGS. 1 and 2, for example. However, a rotatable drive connection may be provided between rotating member 4 and belt reel 1 in this embodiment also.

One or more rotating members 4 may be in drive communication with belt reel 1.

The at least one rotating member 4 is preferably disposed fixedly in the direction of its rotational axis 5, in relation to load limiter chamber 8 and in particular in relation to belt reel 1 as well.

Figure 3A:
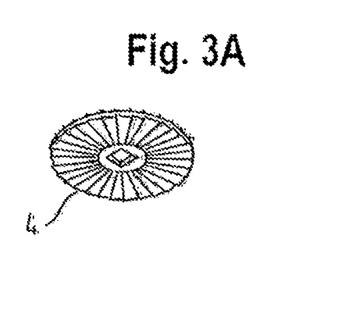
FIGS. 3A-3D: show forms of rotating members which may be used in the embodiment according to FIGS. 1 and 2.
Figure 3B:
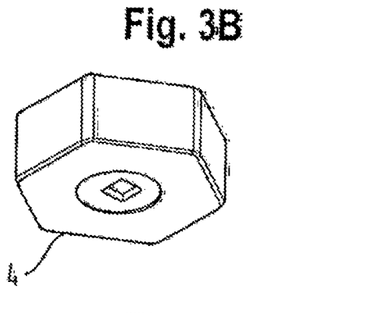
Figure 3C:
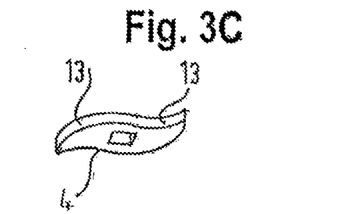
Figure 3D:
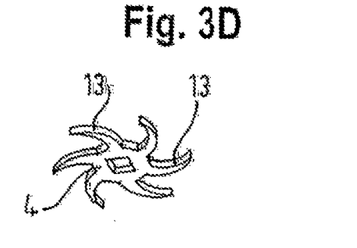
Figure 4:
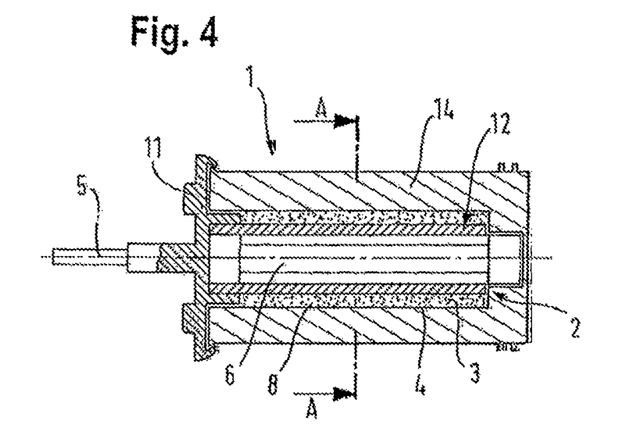
FIG. 4: shows a cutaway view along the axis of the belt reel in a further embodiment of the invention.
Figure 5:
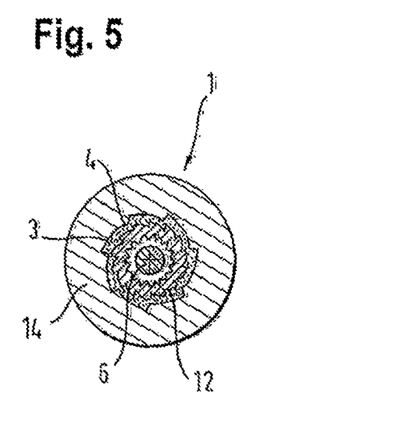
FIG. 5: shows a cross-sectional view along line A-A in the embodiment shown in FIG. 4.
Figure 6:
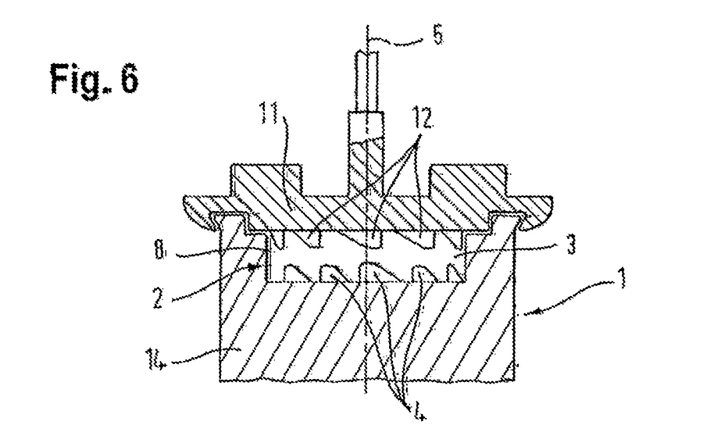
FIG. 6: shows another embodiment of the invention.

As shown in FIGS. 3A-3D, rotating member 4 may have different shapes. For example, the rotating member may be disc-shaped, with radially extending ribs on one or both disc surfaces (FIG. 3A). In the embodiment shown in FIG. 3B, rotating member 4 is in the form of a hexagonal rotating member. In the example shown in FIG. 3C, rotating member 4 is embodied as a rotor with two vanes. In the embodiment in FIG. 3D, rotating member 4 is in the form of an impeller, the embodiment shown having six vanes. The vanes may be curved, as shown in FIG. 3D. However, the vanes may also extend in a straight radial line. The vanes may also have a twist or screw.

The at least one rotating member 4 is preferably dipped wholly or partially into granulate 3. In the embodiment in FIG. 3A, the radially extending ribs on the disc-shaped rotating member 4 are fully submerged in granulate 3. In the embodiment in FIG. 3B, at least the hexagonal circumferential surface of rotating member 4 are submerged fully in the granulate. In the embodiment shown in FIG. 3C, at least the circumferential surfaces 13 of the two vanes are fully submerged in granulate 3. In the embodiment in FIG. 3D, at least the circumferential surfaces 13 on each vane of the impeller are likewise dipped into or submerged in granulate 3.

Figure 8:
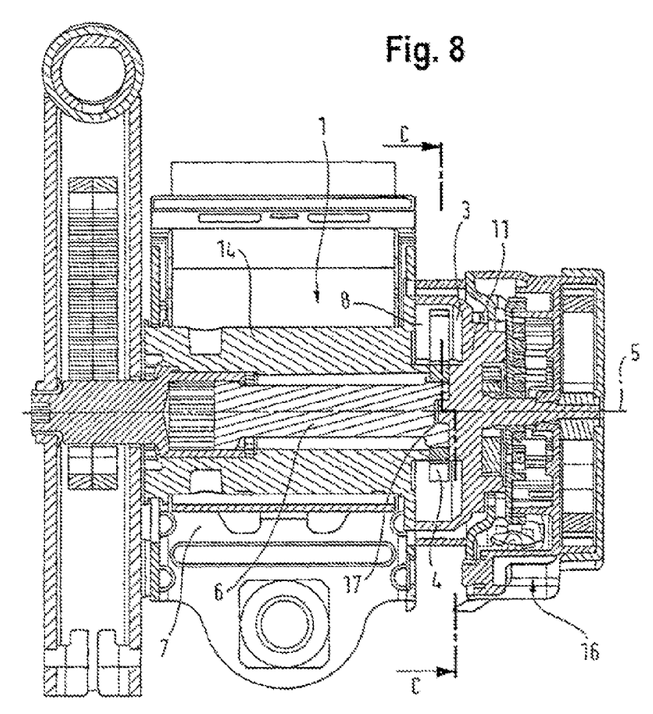
FIG. 8: shows a cutaway view of another embodiment.
Figure 10:
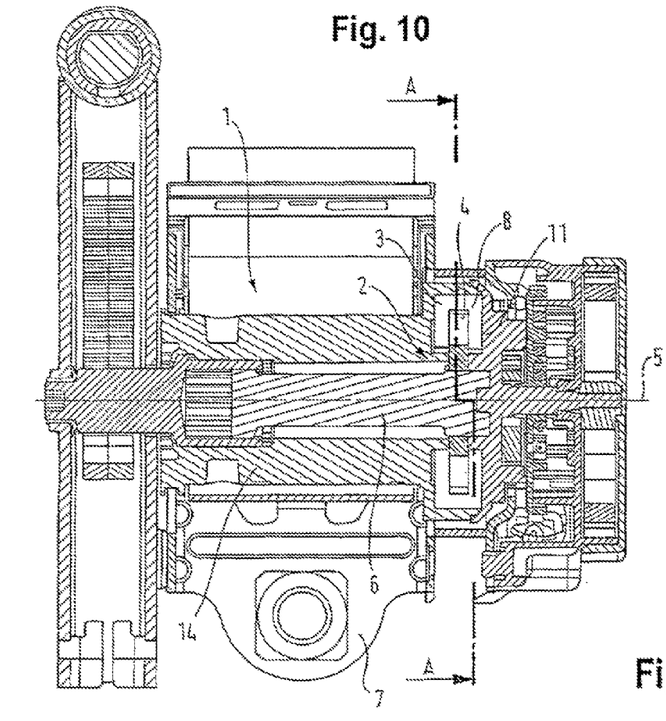
FIG. 10: shows cutaway view of another embodiment.

The belt reel consists substantially of two belt reel parts 11 and 14. The one belt reel part 11 can be blocked from further rotation relative to frame 7 in the event of excessive acceleration or braking, for example in an accident. This can be achieved in a known manner by means of a belt strap-sensitive and/or vehicle-sensitive blocking mechanism 16 (FIGS. 8 and 10). The other belt reel part 14 is rotatable relative to the blocked belt reel part 11, load limiter 2 acting between the blocked belt reel part 11 and the rotatable belt reel part 14 when the safety belt is pulled out.

In the embodiments shown in den FIGS. 4-11, belt reel 1 contains the belt reel part 11 which can be blocked relative to frame 7 and the belt reel part 14 which is rotatable in relation to the blocked belt reel part 11. In normal operation, the entire belt reel 1, i.e. both the blockable belt reel part 11 and the rotatable belt reel part 14, are rotatably mounted on frame 7, together with the load limiter disposed in load limiter chamber 8. In the embodiment shown in FIGS. 4 and 5, load limiter 2 extends inside a substantially circular cylindrical load limiter chamber 8 along belt reel axis 5. On the inner wall of the sleeve- or pot-shaped rotatable belt reel part 14, there are tooth-like projections protruding into granulate 3 and forming a plurality of rotating members 4 on rotatable belt reel part 14, which are rotatable about belt reel axis 5 and which are dipped into granulate 3. Said rotating members 4 extend substantially radially inwardly into granulate 3 and are provided on the outer boundary wall of load limiter chamber 8. Projections may also be provided on the radially inner boundary surface of load limiter chamber 8. Said radially inner boundary surface of load limiter chamber 8 is formed by a sleeve-shaped stator 12 which is joined non-rotatingly to blockable belt reel part 11. However, it is also possible for the radially inner boundary surface of load limiter chamber 8, which is provided on the sleeve-shaped stator 12, to be embodied in a smooth form. In an accident, the blockable belt reel part 11 and stator 12 are preventing from rotating relative to frame 7. Depending on the severity of the accident and the body size and weight of the vehicle passenger wearing the seat belt, the safety belt is unreeled from the belt reel, the rotatable belt reel part 14 rotating relative to the blocked belt reel part 11, and the projections on the inner side of the rotatable belt reel part 14, which form rotating member 4, are rotated relative to granulate 3. Shear force are exerted in the process on the granules of the granulate, which absorb energy and thus impose a limitation on the forces acting between the body of the vehicle passenger who has been moved forwards and the unreeled belt strap.

As shown in FIGS. 4, 5 and 8-11, a torsion bar 6 disposed inside the sleeve-shaped load limiter arrangement may additionally be provided. The one end (the left-hand end of torsion bar 6) is joined non-rotatingly to the blockable belt reel part 11, and the other end (the right-hand end of torsion bar 6) is non-rotatingly joined to rotatable belt reel part 14.

Figure 9:
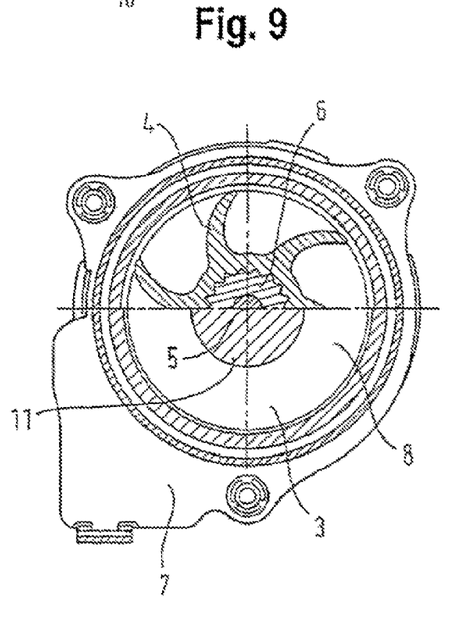
FIG. 9: shows a cross-sectional view along line C-C in FIG. 8.

In the embodiments shown in FIGS. 6-9, the load limiter chamber 8 is located between two opposite end faces on blockable belt reel part 11 and on rotatable belt reel part 14 (FIGS. 6, 7, 10, 11) or on blockable belt reel part 11 (FIGS. 8, 9). The end face on rotatable belt reel part 14 may lie in a hollow disposed rotationally symmetrically in respect of belt reel axis 5. Granulate 3 is located in load limiter chamber 8, and the rotating members 4 embedded in granulate 3 are located on the countersunk end face of rotatable belt reel part 14 in FIG. 6, in the form of substantially radially extending projections. On the opposite end face of blockable belt reel part 11, substantially radially extending projections which likewise protrude into granulate 3 and which produce the effects of stator 12 may be provided.

In these embodiments also, a load limiting effect is produced when the rotatable belt reel part 14 is rotated in relation to the blocked belt reel part 11, said effect being caused by the shear forces which are produced by the rotating members 4 which act as axial projections in granulate 3.

Figure 7:
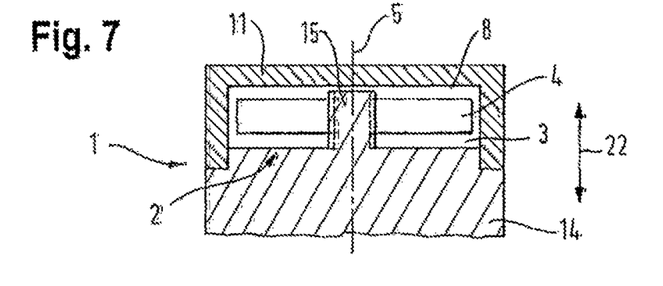
FIG. 7: shows yet another embodiment of the invention.

Instead of the projections acting as rotating member 4, one of the rotating members 4 shown in FIGS. 3A-3D may also be disposed in the load limiter chamber 8 at the end face (FIGS. 7-11). In the embodiment in FIG. 7, said rotating member is disposed non-rotatingly on a stub shaft 15 of rotatable belt reel part 14. A rotating member in the form of an impeller, as shown in FIG. 3D, is preferably disposed in load limiter chamber 8. In the embodiment in FIG. 7, load limiter chamber 8 and granulate 3 are arranged in a recess in blockable belt reel part 11. In FIG. 7, as in the embodiment in FIGS. 4 and 5, the one end of a torsion bar may be joined non-rotatingly to blockable belt reel part 11. The other end of the torsion bar is connected to rotatable belt reel part 14. The torsion bar extends along belt reel axis 5 in a cavity in stub shaft 15 and rotatable belt reel part 14.

In the embodiments shown in FIGS. 8-11, the torsion bar extends as a component of load limiter 2 along the rotational axis 5 of the belt reel. At one end (the left-hand end), torsion bar 6 is connected non-rotatingly to rotatable belt reel part 14. In the embodiment in FIGS. 8 and 9, the other end (the right-hand end) of the torsion bar is connected via a break point 17 to blockable belt reel part 11. Said right-hand end of torsion bar 6 is also joined non-rotatingly to rotating member 4, which is provided in the form of an impeller. In this embodiment, torsion bar 6 acts as a load limiter, up to a particular load threshold determined by break point 17. When the load threshold is exceeded, the connection between torsion bar 6 and blocked belt reel part 11 is broken, with the result that rotating member 4 is rotated with load limitation in the granulate located inside load limiter chamber 8. The rotational movement is transmitted from the rotatable belt reel part 14 via torsion bar 6 to rotating member 4. Load limiter chamber 8 containing granulate 3 is disposed in a recess in blockable belt reel part 11. In this embodiment, it is also possible that the right-hand end of torsion bar 6 is mounted rotatably on blockable belt reel part 11 and is connected to rotating member 4 via a break point embodied, for example, as a slip clutch. When the torque produced by torsion bar 6 is exceeded, torsion bar 6 rotates relative to the rotating member.

Figure 11:
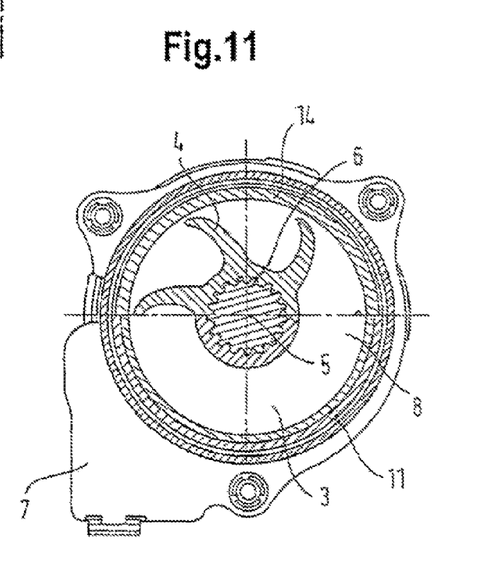
FIG. 11: shows a cross-sectional view along line A-A in FIG. 10.

In the embodiment in FIGS. 10 and 11, torsion bar 6 is joined at its one end (its left-hand end) to rotatable belt reel part 14, and at its other end torsion bar 6 is joined non-rotatingly to rotating member 4, which is likewise embodied as an impeller. Torsion bar 6 is mounted rotatably in relation to blockable belt reel part 11. In the event of the relative rotational movement of rotating member 4 in relation to the granulate disposed in load limiter chamber 8 being blocked, torsion bar 6 acts solely as a load limiter.

Figure 12:
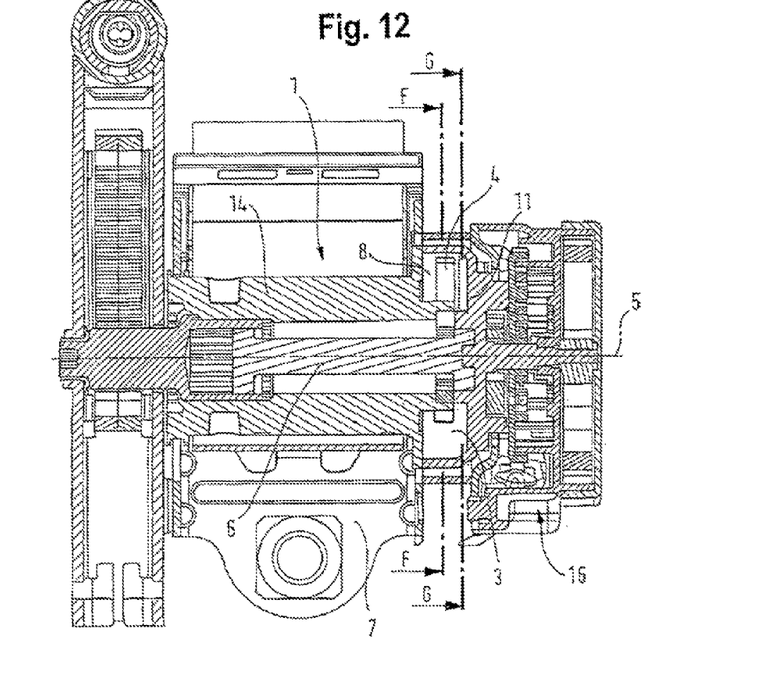
FIG. 12: shows cutaway view of another embodiment.
Figure 13:
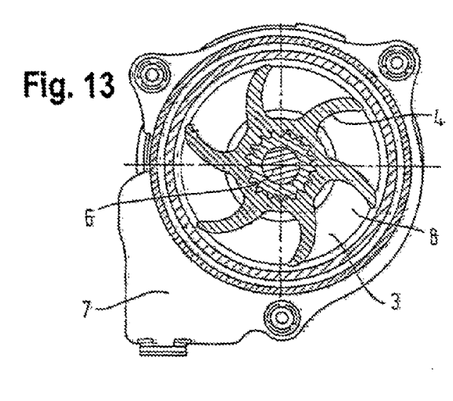
FIG. 13: shows a cross-sectional view along line F-F in FIG. 12.
Figure 13A:
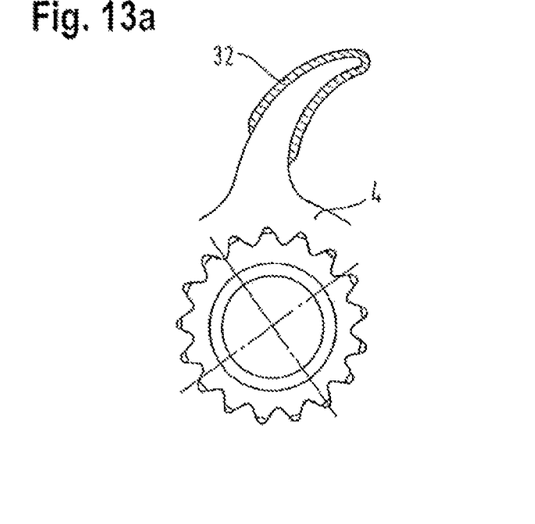
FIG. 13a: shows an alternate embodiment of the invention.
Figure 14:
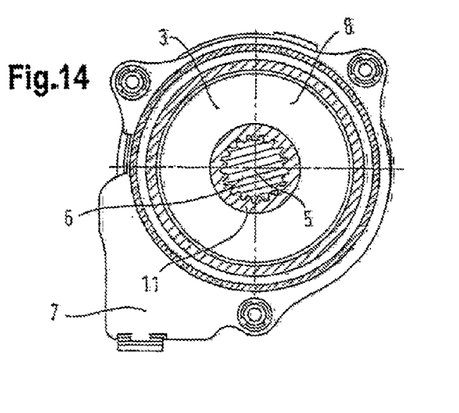
FIG. 14: shows a cross-sectional view along line G-G in FIG. 12.

In the embodiment in FIGS. 12-14, load limiter chamber 9 and granulate 3 are located in a recess in blockable belt reel part 11. Rotating member 4, which is preferably embodied as an impeller (FIG. 3D), is joined non-rotatingly to rotatable belt reel part 14. Rotating member 4 is mounted rotatably in relation to torsion bar 6. When the belt strap is unreeled with load limitation, rotating member 4 rotates together with rotatable belt reel part 14 relative to the blocked belt reel part 11, which contained granulate 3 in load limiter chamber 8. Torsion bar 6, the right-hand end of which is joined non-rotatingly to blocked belt reel part 11, is torsioned simultaneously. This results in an additive limitation effect on the belt strap, as shown in FIGS. 10 and 11. FIG. 13A shows tip rotating member 4 covered by a covering material 32.

In the embodiment in FIGS. 8-14, a blocking mechanism 16 is shown which in a belt strap-sensitive and/or vehicle-sensitive manner prevents the blockable belt reel part 11 from rotating when excessive acceleration or braking occurs, and which in normal vehicle operation prevents the entire belt reel 1 on frame 7 from rotating. In an accident, as already explained, blockable belt reel part 11 on frame 7 is blocked against rotating and rotatable belt reel part 14 can be rotated when the vehicle passenger wearing the seat belt moves forwards with the belt strap unreeling with load limitation.

When rotary wheel 4, embodied as an impeller, rotates clockwise relative to granulate 3 in the embodiment shown in FIGS. 8, 9 and 12-14, the granules in load limiter chamber 8 are displaced substantially in the direction of rotation. Load limiter chamber 8 and granulate 3 are located in a cavity at the end face of rotatable belt reel part 14. In the embodiment in FIG. 10, when rotating member 4 embodied as an impeller rotates clockwise relative to granulate 3, displacement components acting radially outwardly act on the granules in load limiter chamber 8. The vanes of the impeller shown in the embodiment in FIGS. 8-14 are curved. The vanes may be deformed when the load limiter rotates, with the result that an additional influence on the load limitation effect is achieved by such deformation. The vanes may also have a twist.

Rotating member 4, in particular a rotating member in the form of an impeller (FIGS. 3C, 3D and 8-11), may be deformable in the radial direction. In particular, the vanes of the impeller may deform radially outwardly when rotating with energy absorption in granulate 3, as a result of which the effective radius increases and stronger shear forces are exerted on the granules, in particular at the circumferential edge of the vanes.

Figure 1:
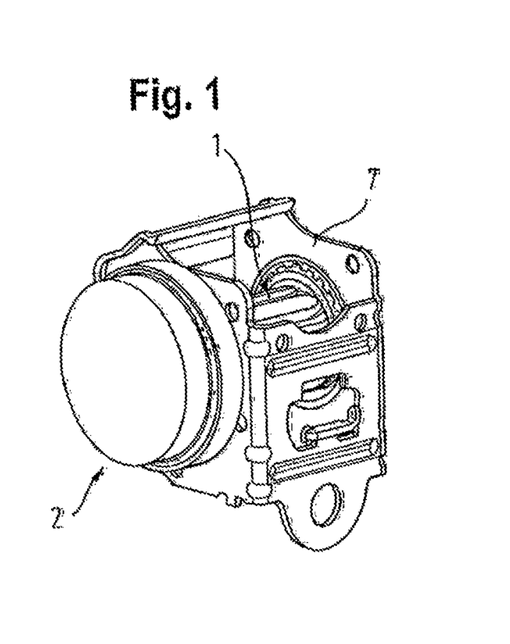
FIG. 1: shows a belt retractor for a vehicle safety belt, comprising a built-in load limiter which is an embodiment of the invention.
Figure 2:
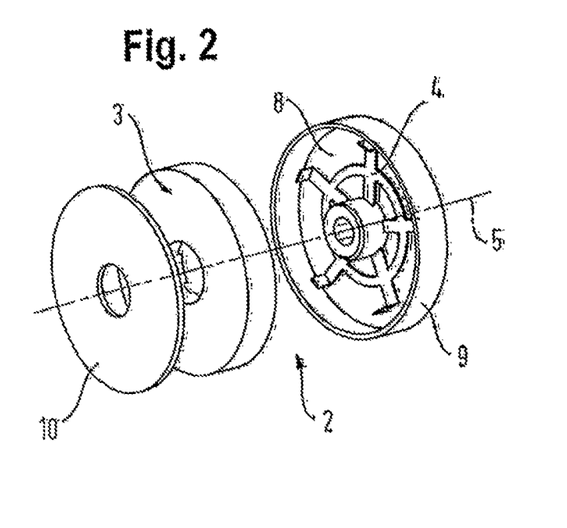
FIG. 2: shows schematically, in an exploded view, components which are used in the embodiment in FIG. 1.

In the embodiment shown schematically in FIGS. 1, 2, load limiter 2 is located in a housing which is attached to the belt retractor frame 7 and which is formed by the two housing sections 9 and 10. Rotating member 4 is disposed in load limiter chamber 8, which is enclosed by the two housing sections 9 and 10. Granulate 3, and rotating member 4 exerting the required shear forces on the granules, are located inside load limiter chamber 8. Housing sections 9 and 10 may be fixedly disposed on frame 7, a coupling between the rotatable belt reel part and rotating member 4 being provided between rotor 4 and belt reel 1, said coupling being disengaged during normal operation of the belt retractor and engaged for operation of the load limiter. The rotating member is preferably arranged coaxially with rotational axis 5 of belt reel 1.

Figure 15:
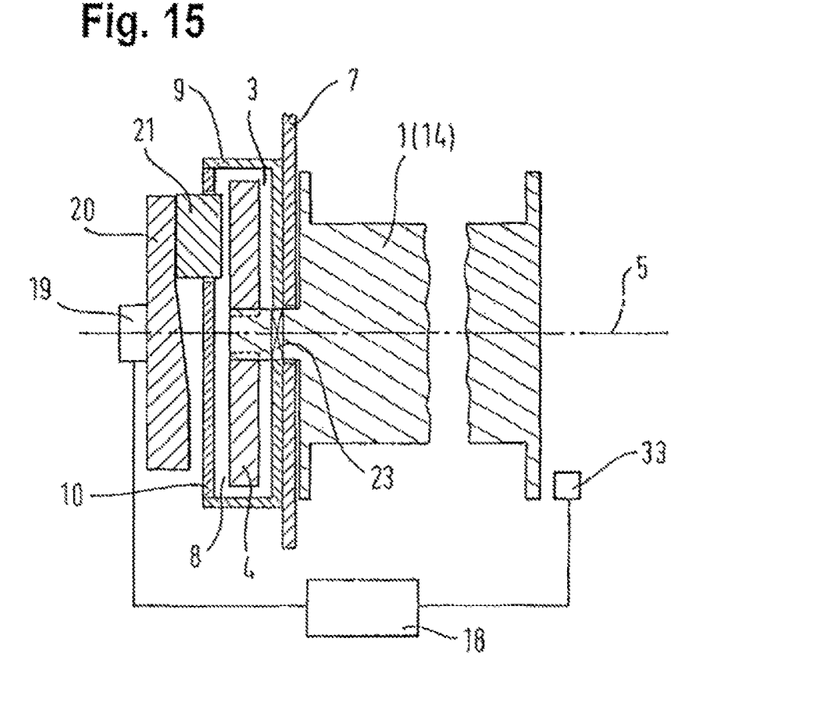
FIG. 15: shows a cutaway view of yet another embodiment.

FIG. 15 shows a cutaway view of another embodiment of the invention. The basic structure of this embodiment is the same as that in the embodiment in FIGS. 1 and 2. Load limiter chamber 1 is enclosed, accordingly, in a housing comprising housing sections 9 and 10. Granulate 3 is located in the load limiter chamber. The housing is attached to frame 7. Rotor 4 in load limiter chamber 8 is connected with a coupling to belt reel 1 and to rotatable belt reel part 14. The coupling is disengaged during normal belt retractor operation, so belt reel 1 can rotate freely relative to rotating member 4. For unreeling of the belt strap under load limitation, coupling 23 is engaged, such that rotating member 4 and belt reel 1 or rotatable belt reel part 14 are connected non-rotatingly to each other.

In this embodiment, the bulk density of the granulate in the load limiter chamber can be adjusted by changing the volume of the load limiter chamber and hence of the granulate 3 with which the load limiter chamber is filled. An adjuster element 20 is provided for this purpose, with which a volume adjuster 21 can be brought into different axial positions in order to change the volume of load limiter chamber 8. Adjuster element 20 may be embodied as a rotatable cam disc which can rotate about rotational axis 5. Depending on the rotation angle position of adjuster element 20, the volume of load limiter chamber 8 and hence the bulk density of granulate 3 is altered by the axial displacement of volume adjuster 21. A servodrive 19, for example an electric motor, which is controlled by a controller 18 may be provided to position the adjuster element 20 in the respective rotation angle position. Said controller may be a separate control unit, or a control unit integrated in the on-board computer of the motor vehicle. In the embodiment shown here, controller 18 is connected to a rotational speed sensor 33. The signal from the rotational speed sensor corresponds to the speed at which the belt strap is unreeled under load limitation from belt reel 1, or more specifically from rotatable belt reel part 14. In controller 18, the respective acceleration and hence an indication of the severity of the accident can be determined, together with the body weight of the vehicle passenger wearing the seat belt. Other key data supplied to controller 18 may include the length of belt unreeled from the parked position of belt reel 1 when putting on the safety belt, the position of the seat in the axial direction of the motor vehicle, the body size and body weight of the vehicle passenger and the acceleration or braking force acting at the position of the vehicle passenger in the vehicle during an accident.

In the embodiment shown in FIGS. 4-7 and FIGS. 10-14, a change in the volume of load limiter chamber 8 can also be produced by a relative displacement, in particular in the axial direction, between blockable belt reel part 11 and rotatable belt reel part 14 within their overlapping region, as shown schematically by a double-headed arrow 22 in FIG. 7.

By means of the invention, the characteristic curves of the load limiter can be adjusted for load-limited extension of the belt strap within a large range in respect of passenger size and weight, and the severity of the accident.

In the belt retractor shown schematically in FIGS. 16-19, a transmission gear with a varying transmission ratio is disposed between belt reel 1 and in particular between rotatable belt reel part 14 and load limiter 2. In the embodiments, transmission gear 24 is designed in such a way that it has a progressive transmission ratio. This progressive transmission ratio can be achieved by varying the distance of a load transmission point 25, from which the torque of belt reel 1, or more specifically of rotatably belt reel part 14, is transmitted to load limiter 2, from a rotational axis 5, which may coincide with rotational axis 5 of the belt reel, when the belt reel turns with load limitation. The distance may be changed along a spiral path 25 around rotational axis 5. The components of the belt retractor shown in FIGS. 16-19 are suitably mounted on a belt retractor frame which is not shown here in any further detail.

Spiral 25 may have a conical profile and be arranged on a conically shaped pulley wheel 30. The conically shaped pulley wheel 30 and hence the load transmission point 25 running in spiral cable grooves are connected via a coupling 23 to belt reel 1, or more specifically to rotatable belt reel part 14. Coupling 23 is designed in such a way that, in the event of any relative rotation of reel part 14 in relation to the torsion bar 6 joined non-rotatingly at one end to the blocked belt reel part 11, it is put into the engaged state when there is any belt unreeling movement. This coupling 23 is disengaged during normal belt retractor operation.

In the embodiments shown, the rotational movement of rotatable belt reel part 14 can be transmitted from the spiral load transmission point 25 to load limiter 2 via load cable 26 when coupling 23 is engaged.

Figure 16:
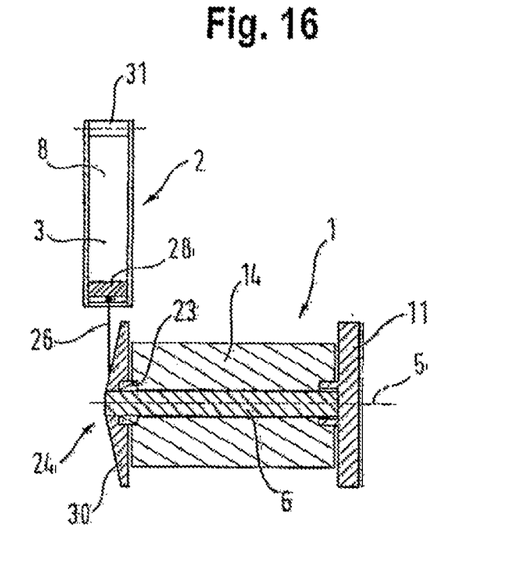
FIG. 16: shows in cutaway view a further embodiment of the invention, in which a displacer body linearly moveable in the load limiter chamber and a progressive transmission gear are used.
Figure 17:
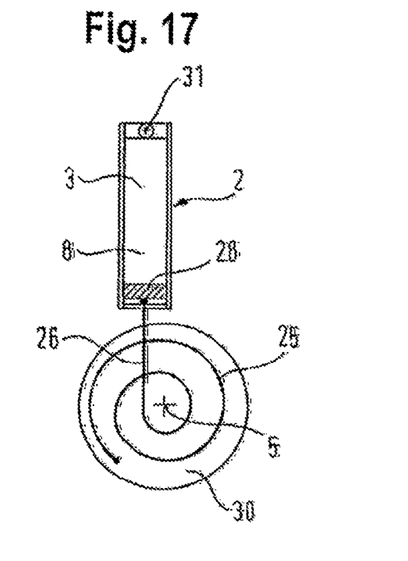
FIG. 17: shows a side view of the embodiment shown in FIG. 16.

In the embodiment shown in FIGS. 16 and 17, load limiter 2 contains a displacer body 28 which is linearly moveable in load limiter chamber 8 and which is disposed like a piston in the granulate 3 in load limiter chamber 8. Load limiter chamber 8 may be attached via attachment point 31 to the belt retractor frame, if necessary pivotably. Displacer body 28 may have axially extending through holes in its displacer body, or axially extending passages at its circumference, through which the granules can pass from one side to the other side of displacer body 28 when displacer body 28 moves.

Figure 18:
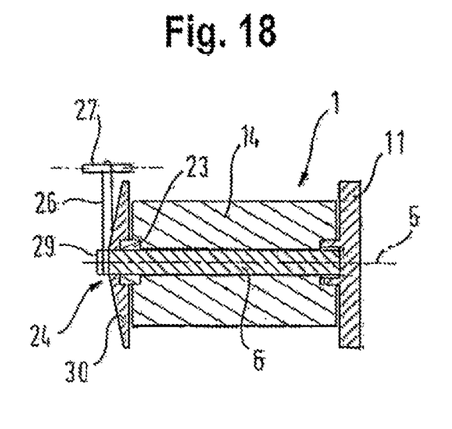
FIG. 18: shows cutaway view of a further embodiment having a progressive transmission gear.

In the embodiment shown in FIG. 18, load cable 26 is guided around a cable deflection point 27, for example a guide pulley, and connected to a pulley wheel 29 which is provided at the end of torsion bar 6. In this way, the rotational movement of the rotatable belt reel part 14 is transferred via the transmission gear to the rotatable end of torsion bar 6. The other end of torsion bar 6 is fixedly connected to blocked belt reel part 11.

Figure 19:
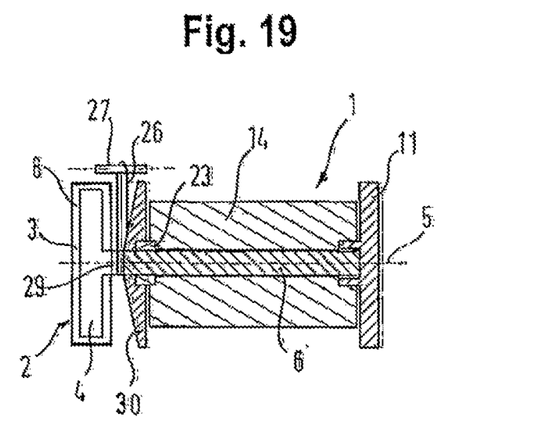
FIG. 19: shows a further embodiment having a progressive transmission gear.

In the embodiment in FIG. 19, rotation of the rotatable belt reel part 14 is transferred via load cable 26 deflected about deflection point 27 to the pulley wheel 29 connected to rotating member 4. Rotating member 4 is a component of load limiter 2, which may be designed as described above with reference to FIGS. 1 and 2.

Figure 20:
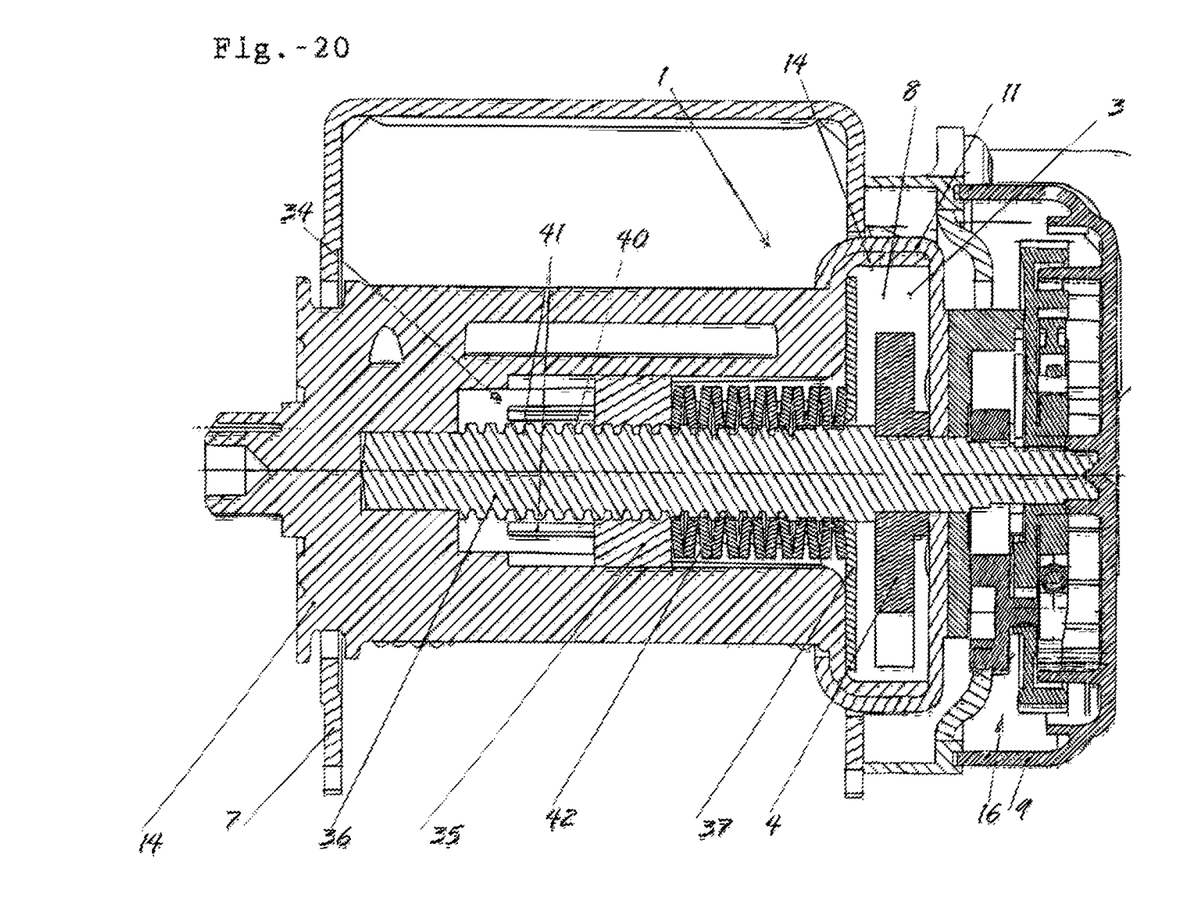
FIGS. 20, 21: show further embodiments.

In the embodiment of a belt retractor shown in FIG. 20, belt reel 1 is rotatably mounted on frame 7. Belt reel 1 consists of blockable belt reel part 11 and belt reel part 14 which is rotatable relative to blocked belt reel part 11. When excessive accelerative or braking forces are exerted, blockable belt reel part 11 is blocked with the aid of blocking mechanism 16, which is embodied in a known form. The blocking mechanism is disposed in housing sections 9 attached to frame 7.

Granulate 3 is disposed in load limiter chamber 8, which is enclosed by blockable belt reel part 11 and by rotatable belt reel part 14. Rotor 4, which may be embodied as an impeller as described in the previous embodiments, is located in the granulate. Rotor 4 sits non-rotatingly on an axial guide 36. Blockable belt reel part 11 is likewise connected non-rotatingly to the axial guide. This can be realised by providing rotor 4 and blockable belt reel part 11 with appropriate inner cross-sections and by providing axial guide 36 with an matching cross-section. This can be achieved, for example, by cross-sections that deviate from a circular shape, for example by oval, polygonal cross-sections, in particular by square cross-sections. Axial guide 36 extends in the axial direction in the middle of belt reel 1 and has a thread 40 in the region of rotatable belt reel part 14. An adjuster element 35, for example in the form of an adjuster nut, has an internal thread which is in thread engagement with the thread 40 (external thread) of rod-shaped axial guide 36. Adjuster element 35 is connected axially displaceably, but non-rotatingly to rotatable belt reel part 14. To this end, rotatable belt reel part 14 may have one or more longitudinal grooves 41 running in the axial direction on an inner circumference. Correspondingly shaped projections on adjuster element 35 engage longitudinally displaceably in said longitudinal grooves 41.

The axial adjusting movement of adjuster element 35 acts via a spring means, for example via a spring assembly 42, which may consist of disc springs, on an actuator member 37. Actuator member 37 closes working chamber 8 from the inner bore in rotatable reel part 14, in which spring assembly 42 is disposed around axial guide 36. Actuator member 37 may be plate-shaped or disc-shaped.

However, it is also possible to produce thread engagement between an inner thread provided on the wall of the inner bore of rotatable belt reel part 14, and on adjuster element 35 an external thread which engages with said inner thread. The axial guide can also be provided in the form of appropriate longitudinal grooves and projections on the inner circumference of adjuster element 35 and on the outer circumference of axial guide 36.

During normal operation of the belt retractor, the belt reel is rotatably mounted, together with working chamber 8, rotor 4 and axial guide 36, on frame 7. When the blocking mechanism is activated, for example in an accident, blockable belt reel part 11, axial guide 36 and rotor 4 are prevented from rotating. When the belt strap is unreeled, for example by forwards movement of the vehicle passenger wearing the seat belt, rotatable belt reel part 14 is rotated, together with granulate 3 enclosed by it in load limiter chamber 8, in relation to blocked rotor 4. Rotor 4 thus acts as an unmoved displacement element in granulate 3. Due to the thread engagement described above, adjuster element 5 moves along axial guide 36 and acts via spring assembly 42 on actuator member 37. Pressure is exerted as a result on granulate 3 in load limiter chamber 8, due to the reduction in volume, and said pressure is used to adjust the effect of the load limiter when the belt strap is unreeled. This adjustment is performed according to the severity of the accident and/or the passenger data, such as body size and weight, and the seat position of the vehicle passenger wearing the seat belt. This adjustment of the load limiter effect is performed by an adjuster means 34, which is automatically activated when the belt strap is unreeled and which includes the adjuster element 35 guided along axial guide 36 and which applies spring action on actuator member 37. Small adjusting movements of actuator member 37 are sufficient to achieve the desired load limitation over a wide range for vehicle passengers of different sizes and weights, and for different accident severities. These adjusting movements are less than the grain size of the granules in granulate 3.

Figure 21:
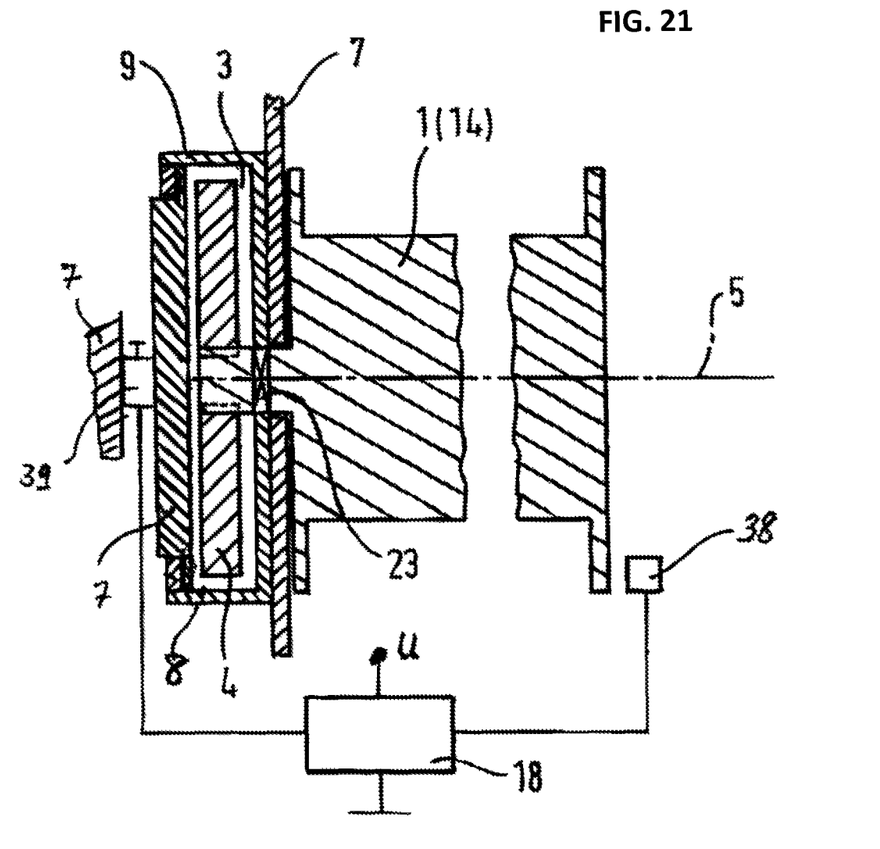

The embodiment shown in FIG. 21 has a construction similar to the embodiment in FIG. 15. A piezoactuator 39 is used as the servodrive for actuator member 37. To control the movement of actuator member 37, an electrical voltage formed by controller 18 according to a measurement signal received from measuring device 38 is applied to the piezoactuator. In the embodiment in FIG. 15, this causes a reduction in the volume of load limiter chamber 8 and a particular pressure to be exerted as a result on granulate 3 in load limiter chamber 8 in order to change the bulk density of the granulate. Piezoactuator 39 rests against a part of belt retractor frame 7 and is disposed between said frame portion and actuator member 37.

Measuring device 38, which is connected to controller 18, may be configured in such a way that it detects the data of the vehicle passenger wearing the seat belt, in particular the seat position, weight and size. Measuring device 38 can also establish the severity of the accident. To do so, measuring device 38 can determine the speed or acceleration with which the belt strap is unreeled. However, measuring device 38 can also detect the braking intensity or acceleration of the vehicle during an accident. Depending on the measurement signals received from measuring device 38, controller 18 sets the voltage applied to piezoactuator 39, and actuator member 37 is adjusted to change the bulk density of granulate 3.

LIST OF REFERENCE SIGNS

1 Belt reel
2 Load limiter
3 Granulate
4 Rotating member
5 Rotational axis
6 Torsion bar
7 Frame
8 Load limiter chamber
9, 10 Housing sections
11 Lockable belt reel part
12 Stator
13 Circumferential surfaces
14 Rotatable belt reel part
15 Stub shaft
16 Locking mechanism
17 Break point
18 Controller
19 Servodrive
20 Adjuster element
21 Volume adjuster
22 Double-headed arrow
23 Coupling
24 Transmission gear
25 Load transmission point (spiral)
26 Load cable
27 Cable deflection point
28 Linear moveable body
29 Pulley wheel
30 Conical pulley wheel
31 Attachment point
32 A covering material
33 Rotational speed sensor
34 Servomechanism
35 Adjuster element
36 Axial guide
37 Actuator member
38 Measuring device
39 Piezoactuator
40 Thread
41 Longitudinal grooves
42 Spring assembly

The invention claimed is:

1. A belt retractor comprising a safety belt reel (1) rotatably mounted on a frame and a load limiter (2) which acts on a rotational movement of the belt reel (1) and has adjustable energy consumption, said load limiter having a granulate (3) which is enclosed in a closed load limiter chamber (8) and consists of dry, granular solid, and at least one member (4), the member (4) and the granulate (3) being arranged so that they are rotatable in relation to each other, wherein the bulk density of the granulate (3) in the load limiter chamber (8) can be varied to adjust the energy consumption, and wherein the member is held fixed in a fixed position and the granulate is rotated in relation to the member.

2. The belt retractor according to claim 1, wherein the bulk density of the granulate (3) in the load limiter chamber (8) can be adjusted according to the acceleration or speed with which the belt is unreeled under load limitation.

3. The belt retractor according to claim 1, wherein the volume of the load limiter chamber (8) or the pressure exerted on the granulate (3) can be varied in order to adjust the bulk density of the granulate (3) in the load limiter chamber (8).

4. The belt retractor according to claim 1, wherein an actuator member (21; 37) controlled by the load-limited rotation of the belt reel (1) or of a rotatable belt reel part (14) is formed to exert a change of pressure on the granulate (3) disposed in the load limiter chamber (8), or to alter the volume of the load limiter chamber (8).

5. The belt retractor according to claim 4, wherein the actuator member (37) is driven by the load-limited rotation of the belt reel (1) or of the rotatable belt reel part (14).

6. The belt retractor according to claim 4, wherein an adjuster means (34; 39) actuated by load-limited rotation of the belt reel (1) or of the rotatable belt reel part (14) adjusts the actuator member (37).

7. The belt retractor according to claim 6, wherein the adjuster means (34) has an adjuster element (35), which can be adjusted by thread engagement when the belt reel (1) or the rotatable belt reel part (14) rotates under load limitation, and which acts upon the actuator member (37).

8. The belt retractor according to claim 7, wherein the adjuster element (35) is guided along an axial guide (36) and the thread engagement is provided with the axial guide (36) or with the belt reel (1) or the rotatable belt reel part (14).

9. The belt retractor according to claim 1, wherein the adjuster means for the actuator member (37) has a piezoactuator (39) which acts upon the actuator member (37).

10. The belt retractor according to claim 1, wherein the granulate (3) is made of hard grains.

11. The belt retractor according to claim 1, wherein the grains of the granulate (3) have a Mohs hardness of at least 4.

12. The belt retractor according to claim 1, wherein the granulate (3) comprises different kinds of grains.

13. The belt retractor according to claim 1, wherein the at least one member (4) is submerged wholly or partially in the granulate (3).

14. The belt retractor according to claim 1, wherein the at least one member (4) is embodied as an impeller, the vanes of which are dipped into the granulate (3).

15. The belt retractor according to claim 14, wherein the vanes are curved.

16. The belt retractor according to claim 14, wherein the respective vane has a twist along its extension.

17. The belt retractor according to claim 1, wherein the grains of the granulate (3) are displaced in the radial direction by the rotation.

18. The belt retractor according to claim 1, wherein the granulate (3) is made of hard grains.

19. The belt retractor according to claim 1, wherein the granulate (3) comprises grains with different degrees of hardness.

20. The belt retractor according to claim 1, wherein the granulate (3) consists of mineral grains.

21. The belt retractor according to claim 1, wherein the granulate is made of quartz ($SiO_2$) sand.

22. The belt retractor according to claim 1, wherein the granulate (3) has grains of glass and/or metal.

23. The belt retractor according to claim 1, wherein the granulate (3) has a bulk density (mass/volume) of between 1 $g/cm^3$ and 4.5 $g/cm^3$.

24. The belt retractor according to claim 1, wherein the load limiter chamber (8) is disposed in the belt reel (1).

25. The belt retractor according to claim 1, wherein the load limiter chamber (8) is disposed in a blockable belt reel part (11) and/or in a rotatable belt reel part (14).

26. The belt retractor according to claim 25, wherein the torsion bar (6) is connected to the rotatable belt reel part (14).

27. The belt retractor according to claim 26, wherein the torsion bar-(6) is also connected to the blockable belt reel part (11) via a break point (17) which is triggered when a force threshold is exceeded.

28. The belt retractor according to claim 1, wherein the load limiter chamber (8) is disposed in a housing (9, 10) attached to the frame (7).

29. The belt retractor according to claim 1, wherein the load limiter (2) has a torsion bar (6) in addition.

30. The belt retractor according to claim 1, wherein the torsion bar (6) is connected to a blockable belt reel part (11) and to a belt reel part which is rotatable in relation to the blockable belt reel part (11).

* * * * *